United States Patent [19]

Domres

[11] 4,346,873
[45] Aug. 31, 1982

[54] LEAD SCREW PORTABLE TORCH DRIVE

[76] Inventor: Franklin W. Domres, 4117 Crescent Beach Rd., Manistee, Mich. 49660

[21] Appl. No.: 235,524

[22] Filed: Feb. 18, 1981

[51] Int. Cl.³ .............................................. B23K 7/10
[52] U.S. Cl. ......................................... 266/71; 266/77
[58] Field of Search ............................. 266/71, 77, 48

[56] References Cited

U.S. PATENT DOCUMENTS 1,358,637  11/1920  Herron .................................. 266/71
3,713,637  1/1973  Cable et al. .......................... 266/71
3,908,973  9/1975  Martin ................................. 266/71
4,158,315  6/1979  Kensrue et al. ...................... 266/71

*Primary Examiner*—W. Stallard
*Attorney, Agent, or Firm*—Price, Heneveld, Huizenga and Cooper

[57] ABSTRACT

A portable torch support and guide having a torch mounting carriage advanceable along a track by a threaded member on the carriage in releasable engagement with a feed screw. Release of the bearing from the feed screw allows rapid return of the carriage.

13 Claims, 9 Drawing Figures

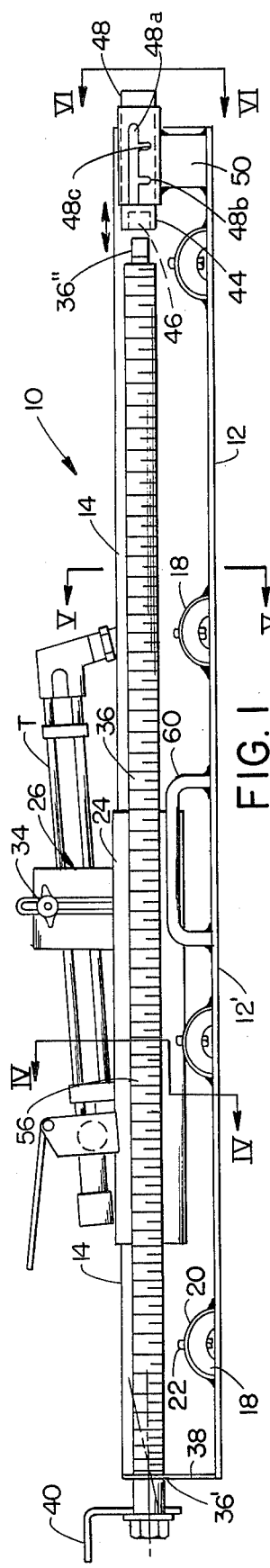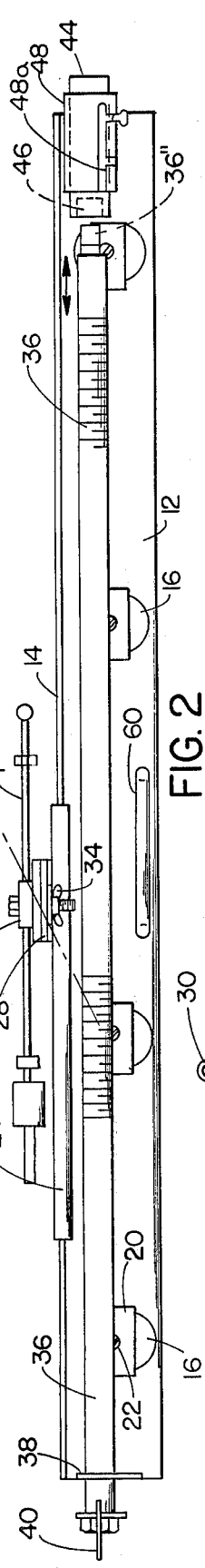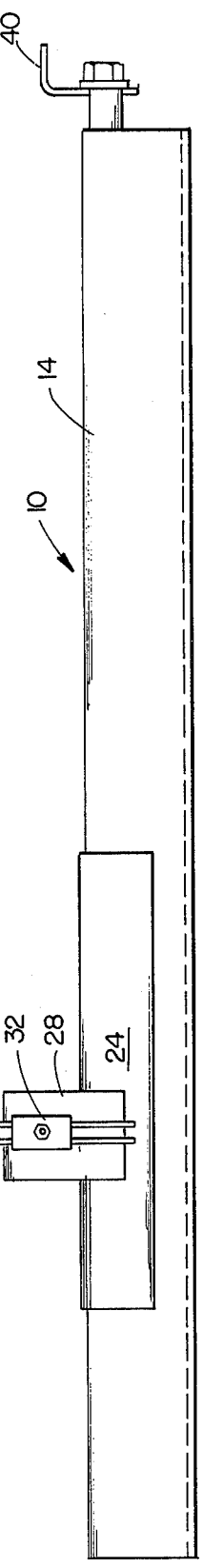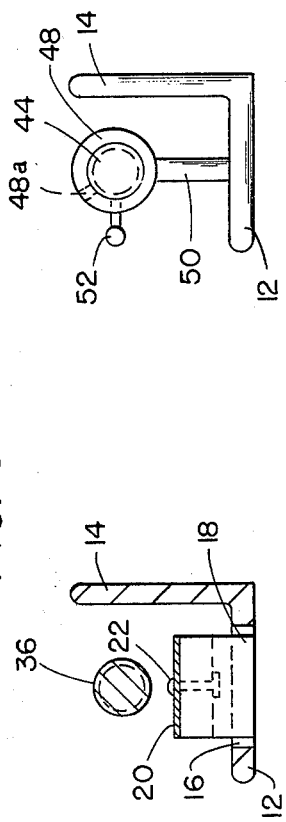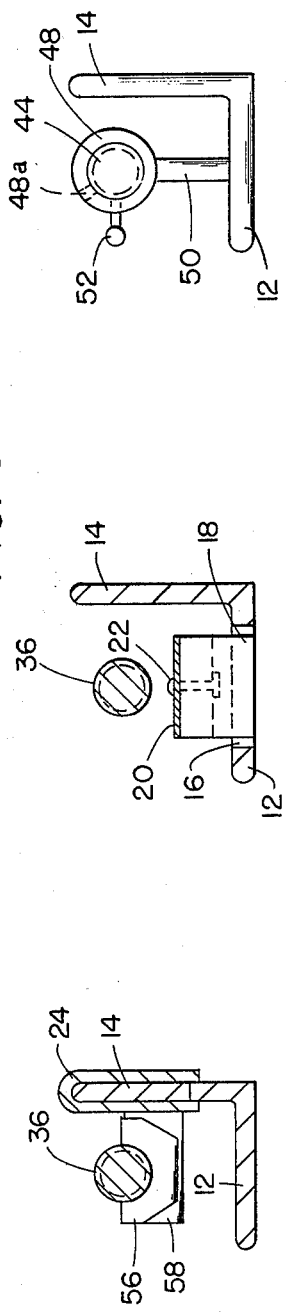

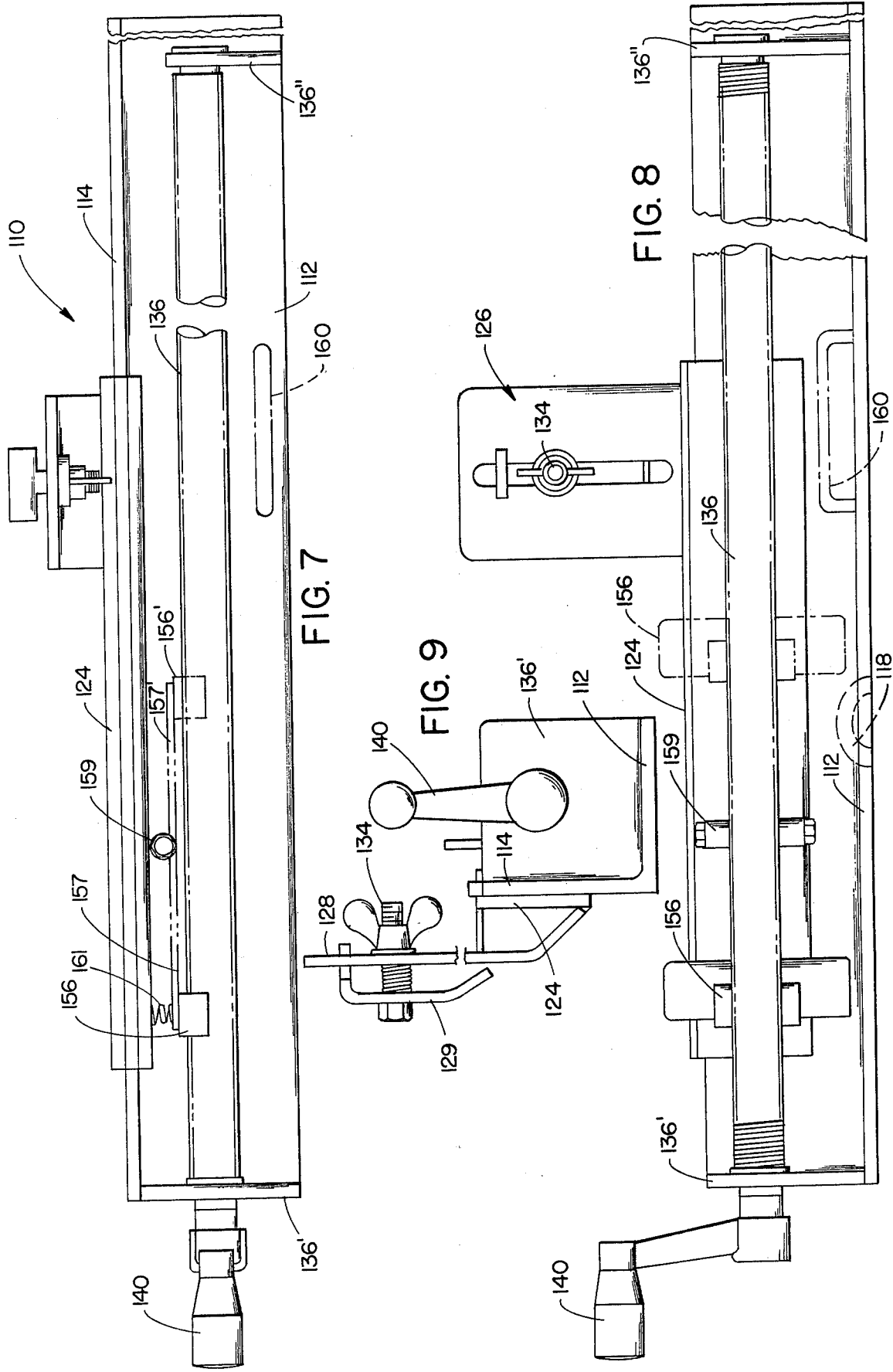

LEAD SCREW PORTABLE TORCH DRIVE

BACKGROUND OF THE INVENTION

This invention relates to a portable torch support and guide.

Mechanized advancement of a cut-off torch along a workpiece is generally known, there having been a variety of machines devised for this general purpose. Some of these employ a lead screw for torch advancement, see e.g. U.S. Pat. Nos. 3,908,973, 3,713,635, 3,485,306, 2,496,110, 2,448,089, 2,283,347, 2,107,396, 1,696,916, 1,674,843, 1,358,637, British Pat. No. 546,009 and German Pat. No. 339,438. Typically, such machines are permanent type units, although some special purpose units such as the H-beam upper end cutter in U.S. Pat. No. 3,908,973 can be clamped to the workpiece, or as in U.S. Pat. No. 3,485,306 and British Pat. No. 546,009 can be magnetically secured to the workpiece. U.S. Pat. No. 3,908,973 also sets forth one type of screw drive release mechanism.

SUMMARY OF THE INVENTION

An important object of this invention is to provide a portable cut-off torch support and guide capable of quick and easy attachment to a workpiece in any desired location, e.g. even in a storage yard so that there is no necessity of transporting large heavy stock to a special processing area and no requirement for electrical power. The unit is particularly advantageous for small welding shops and farm usage. With the novel unit, straight and accurate cuts can be achieved, and the carriage which advances the torch, after advancement, can be quickly manually returned to its starting position.

The torch mount is on a carriage advanceable along a feed screw having a releasable threaded connection to a threaded follower on the carriage. In one embodiment, the lead screw is supported on one end thereof by a stationary bearing, and at the other end thereof by a shiftable second bearing releasable from the feed screw to allow the lead screw to disengage the threaded follower. In another embodiment, the second bearing is fixed, and the threaded follower is shiftable to disengage the lead screw.

BRIEF DESCRIPTION OF THE DRAWINGS

FIG. 1 is a front elevational view of one embodiment of the novel apparatus;

FIG. 2 is a plan view of the apparatus in FIG. 1;

FIG. 3 is an elevational view from the opposite side of that in FIG. 1;

FIG. 4 is a sectional view taken on section IV—IV of FIG. 1;

FIG. 5 is a sectional view taken on section V—V of FIG. 1;

FIG. 6 is an end elevational view taken in the direction VI—VI of FIG. 1;

FIG. 7 is a plan view of a second embodiment of the apparatus;

FIG. 8 is a front elevational view of the apparatus in FIG. 7; and

FIG. 9 is an end elevational view of the second embodiment, viewed from the left end of FIG. 8.

DESCRIPTION OF THE PREFERRED EMBODIMENTS

Referring now specifically to FIGS. 1-6 of the drawings, the novel apparatus 10 depicted includes an elongated support base 12 having upstanding from one edge thereof an elongated carriage track 14. These two members are preferably the flanges of a piece of angle iron stock such that the horizontal flange forms the support base and vertical flange forms the carriage track. At spaced intervals along the support base is a plurality of openings 16. Through each opening extend the two polar ends of a magnet 18 so as to be generally coplanar with bottom surface 12' of support base 12. Each of the series of magnets is retained in position by a semicylindrical upstanding retainer 20 as of sheet metal or the like having its ends secured to the support base astraddle of the opening, with the magnet attached to the retainer by a bolt or other fastener 22.

Positioned on and straddling track 14 is an inverted U-shaped slide carriage 24 having an upstanding torch mount subassembly 26 thereon. The torch mount subassembly may include a backplate 28, a torch receiving clip 30, and a bolted clamp 32, or the equivalent, to enable a conventional torch to be held for example in the orientation of the torch T. It can be moved as represented by the phantom line in FIG. 2. The torch may be attached and removed by fastener 34 such as a bolt subassembly.

Extending longitudinally of the elongated structure, parallel to the support base and the track is a threaded feed screw 36. One end 36' extends through and is supported by bearing plate 38 attached as by weldment to the adjacent end of base 12 and extending upwardly therefrom perpendicular to the flange forming carriage track 14. The interfit between end 36' and bearing 38 has sufficient clearance to allow the lead screw 36 to be angularly tilted from its normal horizontal orientation depicted through a limited small acute angle to base 12 as represented by the center lines in FIG. 1. Outwardly of bearing 38 on the lead screw is a manual screw actuator handle 40 radially offset and preferably of L-shaped configuration to allow the screw to be manually rotated. At the opposite end 36'' from end 36' of lead screw 36 is a cylindrical bearing portion cooperative with a retractable bearing assembly.

More specifically, a cylindrical sleeve 44 oriented in axial alignment with the lead screw, and particularly with the adjacent cylindrical bearing end portion 36'' thereof, has a cylindrical bearing cavity 46 in its end capable of receiving and loosely fitting over bearing surface 36''. Sleeve 44 is axially shiftable within a fixed outer sleeve 48 securely attached to base 12 by pillar 50. Sleeve 44 is slidably adjustable and retainable in a particular position in sleeve 48 by a pin and slot interconnection therebetween. That is, an axially elongated slot 48a in sleeve 48 has a pair of axially spaced transverse slots 48b and 48c extending therefrom to allow a radial pin 52 extending from inner sleeve 44 to be manually adjusted along slot 48a into either of slots 48b or 48c. This enables cylindrical opening 46 to be placed over and in supporting relationship with bearing surface 36'', or retracted away therefrom.

Carriage 24 is drivingly interconnectable with the lead screw by means of a threaded member 56 which extends around 180° or less of the lower peripheral part of an axial portion of lead screw 36, with the lead screw resting therein. The threaded interengagement of this member 56 with the lead screw 36, assisted by the weight of the lead screw, causes the member and thus the carriage to be advanced when the screw is rotated. This threaded member 56 may be attached to carriage 24 by an intermediate flange 58 secured to both.

Retraction of bearing support sleeve 44 from end 36" of the feed screw, and the releasable connection of the threaded member 56 from the feed screw, enables the feed screw to be tilted on bearing 38 and elevated out of driving engagement with threaded member 56 allowing carriage 24 to be quickly manually slid back to the starting position.

To enable the portable unit to be readily carried about, a suitable handle, e.g. inverted U-shaped handle 60, is attached to the assembly, preferably to base 12, positioned so as not to interfere with any of the operative components.

To use the novel apparatus, it is readily carried by handle 60 to the location at which stock is to be cut, e.g. in a storage yard, positioned in proper orientation on the stock to be cut, preferably using an edge of support 12 to align the unit with a straight line to be cut, the magnets holding it in position, mounting a torch T in torch mount subassembly 26 with its discharge nozzle oriented downwardly toward the stock, and with carriage 24 at the start position closest to actuating handle 40.

The lead screw 36 rests in functional interrelationship with threaded drive member 56, and bearing sleeve 44 is placed in supporting relation to end 36" of lead screw 36. The unit is then ready for operation. After the torch is lit, the carriage and torch are manually advanced at a controlled rate necessary for the thickness of the stock by rotating screw actuator 40 and thus lead screw 36 to drive threaded member 56 and carriage 24 with torch T along a line parallel to elongated track 14. At the end of the cut, bearing sleeve 44 is retracted using radial pin 52 to slide sleeve 44 back in sleeve 48, screw 36 is tilted by raising end 36" to release its connection with threaded member 56, and carriage 24 is manually slid back to its initial position. A second cut can then be taken either by adjusting the angular mounting of torch T or moving the assembly by simply lifting it and placing it in the new desired location. There is no need to haul heavy stock into a shop or other processing area. There is no necessity for electrical power. The unit has proven to operate quickly, efficiently, and accurately for many types of stock, serving as a handy, inexpensive tool for the smaller welding shops or farm usage.

Referring now specifically to FIGS. 7-9, the modified assembly 110 there depicted includes an elongated support base 112 having an upstanding edge forming an elongated carriage track 114 comparable to that in FIG. 1. The support base includes a plurality of magnetic retention elements 118 of the type depicted in FIGS. 1 and 2. Positioned on track 114 is an inverted U-shaped slide carriage 124 having an upstanding torch mount subassembly 126 thereon.

Extending longitudinally of the structure, parallel to the support base and track, is the elongated feed screw 136 supported in bearing plates 136' and 136" at opposite ends of the screw. Outwardly of the bearing plate 136' is a manual screw actuator handle of the L-shaped or crank-type 140 to allow the screw to be manually rotated.

Carriage 124 is drivingly interconnectable with the lead screw by a threaded half nut 156 which engages a peripheral portion of 180° or less of the lead screw, and is mounted on a bracket 157 which is pivotally attached at 159 to the carriage 124. Element 156 is biased into threaded engagement with the screw shaft by a compression spring 161 between bracket 157 and carriage 124, spaced from pivot 159.

Rotation of crank handle 140 thereby rotates lead screw 136, causing torch carriage 124 to be moved along track 114 by the threaded engagement of element 156 with the lead screw. Quick return of the carriage can be achieved by depressing threaded member 156 out of engagement with the lead screw, against the bias of compression spring 161, and sliding the carriage to the desired position.

The alternative potential position of the threaded member and its support is depicted in phantom lines in FIG. 7 at 156' and 157'.

To enable the portable unit to be readily carried about, a suitable handle 160 (portrayed in phantom) is employed.

The torch is retained on subassembly 126 by clamping it between upstanding plate 128 and adjacent bracket 129 held to the plate by threaded fastener 134.

The function of this modified apparatus will be readily understood from the above description and that of the first embodiment. After the torch is mounted, operation of the crank advances the carriage and torch along the lead screw. At the end of the pass, threaded follower 156 is depressed, i.e. shifted away from the lead screw to release the connection, thereby allowing the follower, carriage, and torch to be returned to the starting position.

The embodiments of the invention in which an exclusive property or privilege is claimed are defined as follows:

1. A portable torch support and guide comprising:
   an elongated support base for resting on metallic stock to be cut;
   retention magnets attached to said support base and oriented to engage the metallic stock for retaining said support base to said stock;
   an upstanding carriage track along said support base;
   a torch mounting carriage movable along said carriage track and having means for mounting a torch thereon;
   a feed screw lengthwise along said elongated support base, having a first end and an opposite second end, a screw actuator at said first end of said feed screw,
   a first bearing support on said support base, at said first end of said feed screw, said feed screw being tiltable at said first bearing support through a small acute angle;
   a second bearing support adjacent the opposite end of said support base from said first bearing support, shiftable into and out of support engagement with said second end of said feed screw;
   and said carriage having a threaded member in engagement with said feed screw for driving said carriage therealong, said feed screw being releasable from said threaded member with tilting of said feed screw to allow rapid return of said carriage to its starting position.

2. The portable torch support and guide in claim 1 wherein said feed screw has a bearing surface on said second end, and said second bearing support comprises a bearing shiftable axially into bearing engagement with and out of bearing engagement with said feed screw bearing surface.

3. The portable torch support and guide in claim 2 wherein said shiftable bearing is supported in a sleeve mounted to said support base and has a slot and pin engagement therewith for controlled positioning of said shiftable bearing.

4. A portable torch support and guide comprising:
an elongated support base for resting on metallic stock to be cut;
a carrying handle on said support base enabling said portable torch support and guide to be readily carried about;
retention magnets attached to said support base and oriented to engage the metallic stock for retaining said support base to said stock;
an upstanding carriage track along said support base;
a torch mounting carriage movable along said carriage track and having means for mounting a torch thereon;
a feed screw lengthwise along said elongated support base, a screw actuator at one end of said feed screw;
a first bearing support on said support base for said feed screw;
said carriage having a threaded member engageable with said feed screw for advancing said carriage along said track, and said threaded member and feed screw being disengagble for rapid return of said carriage.

5. The portable torch support and guide in claim 4 wherein said threaded member engages 180° or less of the periphery of a portion of said feed screw.

6. The portable torch support and guide in claim 5 wherein said threaded member engages the bottom peripheral part of said feed screw portion.

7. The portable torch support and guide in claim 4 wherein said feed screw has first and second ends, said first end is in bearing relation to said first bearing support;
a second bearing support in bearing relation to said second feed screw end;
and said feed screw is shiftable relative to said bearing supports for disengagement of said feed screw from said threaded member.

8. A portable torch support and guide comprising:
an elongated support base for resting on metallic stock to be cut;
retention magnets attached to said support base and oriented to engage the metallic stock for retaining said support base to said stock;
an upstanding carriage track along said support base;
a torch mounting carriage movable along said carriage track and having means for mounting a torch thereon;
a feed screw lengthwise along said elongated support base, having a first end and an opposite second end, a screw actuator at said first end of said feed screw,
a first bearing support on said support base at said first end of said feed screw;
said feed screw having a bearing surface on said second end, and said second bearing support comprises a bearing shiftable axially into bearing engagement with and out of bearing engagement with said feed screw bearing surface;
said carriage having a threaded member engageable with said feed screw for advancing said carriage along said track, said feed screw being disengageable from said threaded member whereby with disengagement of said second bearing support from said feed screw, the latter can be disengaged from said threaded member for rapid return of said carriage.

9. The portable torch support and guide in claim 8 wherein said threaded member engages 180° or less of the bottom peripheral part of a portion of said feed screw.

10. The portable torch support and guide in claim 9 wherein said shiftable bearing is supported in a sleeve mounted to said support base and has a slot and pin engagement therewith for controlled positioning of said shiftable bearing.

11. The portable torch support and guide in claim 8 wherein said feed screw is movable at said first bearing support to allow disengagement of said lead screw from said threaded member for rapid return of said carriage.

12. The portable torch support and guide in claim 11 wherein said feed screw is tiltable through a small acute angle at said first bearing support to allow said disengagement.

13. The portable torch support and guide in claim 11 including a carrying handle on said support base.

* * * * *